US010171399B2

(12) United States Patent
Bastide et al.

(10) Patent No.: US 10,171,399 B2
(45) Date of Patent: *Jan. 1, 2019

(54) MANAGING MESSAGE THREADS THROUGH USE OF A CONSOLIDATED MESSAGE

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,164

(22) Filed: Jul. 11, 2018

(65) Prior Publication Data

US 2018/0324128 A1 Nov. 8, 2018

Related U.S. Application Data

(63) Continuation of application No. 14/948,412, filed on Nov. 23, 2015, now Pat. No. 10,063,509.

(51) Int. Cl.
*G06F 15/16* (2006.01)
*H04L 12/58* (2006.01)
*H04L 29/06* (2006.01)

(52) U.S. Cl.
CPC .............. *H04L 51/16* (2013.01); *H04L 51/06* (2013.01); *H04L 51/36* (2013.01); *H04L 67/42* (2013.01)

(58) Field of Classification Search
CPC ......... H04L 51/16; H04L 51/06; H04L 51/36; H04L 67/04
USPC .................................................. 709/206, 223
See application file for complete search history.

(56) References Cited

U.S. PATENT DOCUMENTS

| 8,375,100 | B1 | 2/2013 | Rivera |
| 8,495,105 | B2 | 7/2013 | Campbell et al. |
| 8,830,876 | B2 | 9/2014 | Ristock et al. |
| 8,886,658 | B2 | 11/2014 | Zheng et al. |
| 8,943,144 | B2 | 1/2015 | Farrell et al. |
| 9,923,862 | B2 | 3/2018 | Abou Mahmoud et al. |
| 2006/0031324 | A1 | 2/2006 | Chen et al. |
| 2011/0231499 | A1 | 9/2011 | Stovicek et al. |

(Continued)

OTHER PUBLICATIONS

IP.com, "Percentage Driven Business Attention Management". IPCOM000235987D, Apr. 1, 2014.

(Continued)

*Primary Examiner* — Philip B Tran
(74) *Attorney, Agent, or Firm* — Law Office of Jim Boice

(57) ABSTRACT

A method, system, and or computer program product manages message threads. A message server detects a message thread addressed to a client device. The message thread is an exchange of multiple message replies related to a first topic discussed in an initial message. The message server determines whether a quantity of messages in the message thread exceeds a predetermined limit during a specified amount of time. If so, then the message server generates a consolidated single message that describes content of the multiple message replies in the message thread, and transmits the consolidated single message to the client device.

20 Claims, 5 Drawing Sheets

(56) References Cited

U.S. PATENT DOCUMENTS

| | | |
|---|---|---|
| 2011/0281594 A1 | 11/2011 | Goldberg et al. |
| 2014/0006400 A1 | 1/2014 | Bastide et al. |
| 2014/0096033 A1 | 4/2014 | Blair |
| 2015/0100644 A1 | 4/2015 | Gulik |
| 2015/0269155 A1 | 9/2015 | Bastide et al. |
| 2016/0080303 A1 | 3/2016 | Deolalikar et al. |
| 2017/0149713 A1* | 5/2017 | Bastide .......... H04L 51/16 |

OTHER PUBLICATIONS

Dyer, Pam. "Understanding Facebook Edgerank [Infographic]". socialmediatoday.com, May 6, 2013. <http://www.socialmediatoday.com/content/understanding-facebook-edgerank-infographic>.

IBM.com. "Download SwiftFile Mail Assistant for Notes Client 8.x". IBM Corporation. <http://www-01.ibm.com/support/docview.wss?uid=swg24019219>.

Slashdot.com. "Facebook Launches Advanced AI Effort To Find Meaning In Your Posts". Slashdot.com, Sep. 21, 2013. <http://tech.slashdot.org/story/13/09/21/1831239/facebook-launches-advanced-ai-effort-to-find-meaning-in-your-posts>.

Wikipedia.com. "Deep Learning". Wikimedia Foundation, Inc., Nov. 12, 2015. <https://en.wikipedia.org/wiki/Deep_learning>.

Reed, Frank. "Facebook Looks To Improve News Feed Content Quality". Marketing Pilgrim, Aug. 26, 2013. <http://www.marketingpilgrim.com/2013/08/facebook-looks-to-improve-news-feed-content-quality.html>.

IBM.com. "SPSS Text Analytics for Surveys". IBM Corporation. <http://www-03.ibm.com/software/products/en/spss-text-analytics-surveys>.

IBM.com. "SPSS Statistics". IBM Corporation. <http://www-01.ibm.com/software/analytics/spss/products/statistics/>.

Wikipedia.com. "Graph Theory". Wikimedia Foundation, Inc., Nov. 15, 2015. <https://en.wikipedia.org/wiki/Graph_theory>.

Rohall et al., "ReMail: a reinvented email prototype". CHI 2004 Extended Abstracts on Human Factors in Computing Systems, CHI EA 2004, ACM, New York, NY, pp. 791-792.

MaClean et al., "Groups without tears: mining social topologies from email". Proceedings of the 16th International Conference on Intelligent User Interfaces, IUI 2011. ACM, NEw York, NY, pp. 83-92.

SaneBox.com, "SaneBox at Work". Sanebox, Inc., 2015. <https://www.sanebox.com/business>.

U.S. Appl. No. 14/567,964, filed Dec. 11, 2014.

List of IBM Patents or Patent Application Treated as Related. Jul. 10, 2018.

* cited by examiner

MANAGING MESSAGE THREADS THROUGH USE OF A CONSOLIDATED MESSAGE

BACKGROUND

The present disclosure relates to the field of telecommunication sessions, and specifically to communication message threads. Still more specifically, the present disclosure relates to managing the display of message threads through the use of a consolidated message that describes a message thread.

A message thread is defined as a series of text messages resulting from exchanges of replies to an initial text message. For example, a user may send out an initial text message related to "Topic X" to multiple recipients. One or more of the multiple recipients may "reply to all" of the multiple recipients in a text message responding to the initial text message. Thereafter, recipients of the "reply to all" message may respond with their own "reply to all" message, such that the number of replies grows rapidly, thus overpopulating the message inbox of one or more users, including but not limited to the author of the initial text message.

SUMMARY

A method, system, and or computer program product manages message threads. A message server detects a message thread addressed to a client device, where the message thread comprises an exchange of multiple message replies to messages related to a first topic. The message server determines whether a quantity of messages in the message thread exceeds a predetermined limit during a specified amount of time. In response to determining that the quantity of messages in the message thread exceeds the predetermined limit during the specified amount of time, the message server generates a consolidated single message that describes content of the multiple message replies in the message thread, and transmits from the message server to the client device, the consolidated single message.

DETAILED DESCRIPTION

Figure 1:
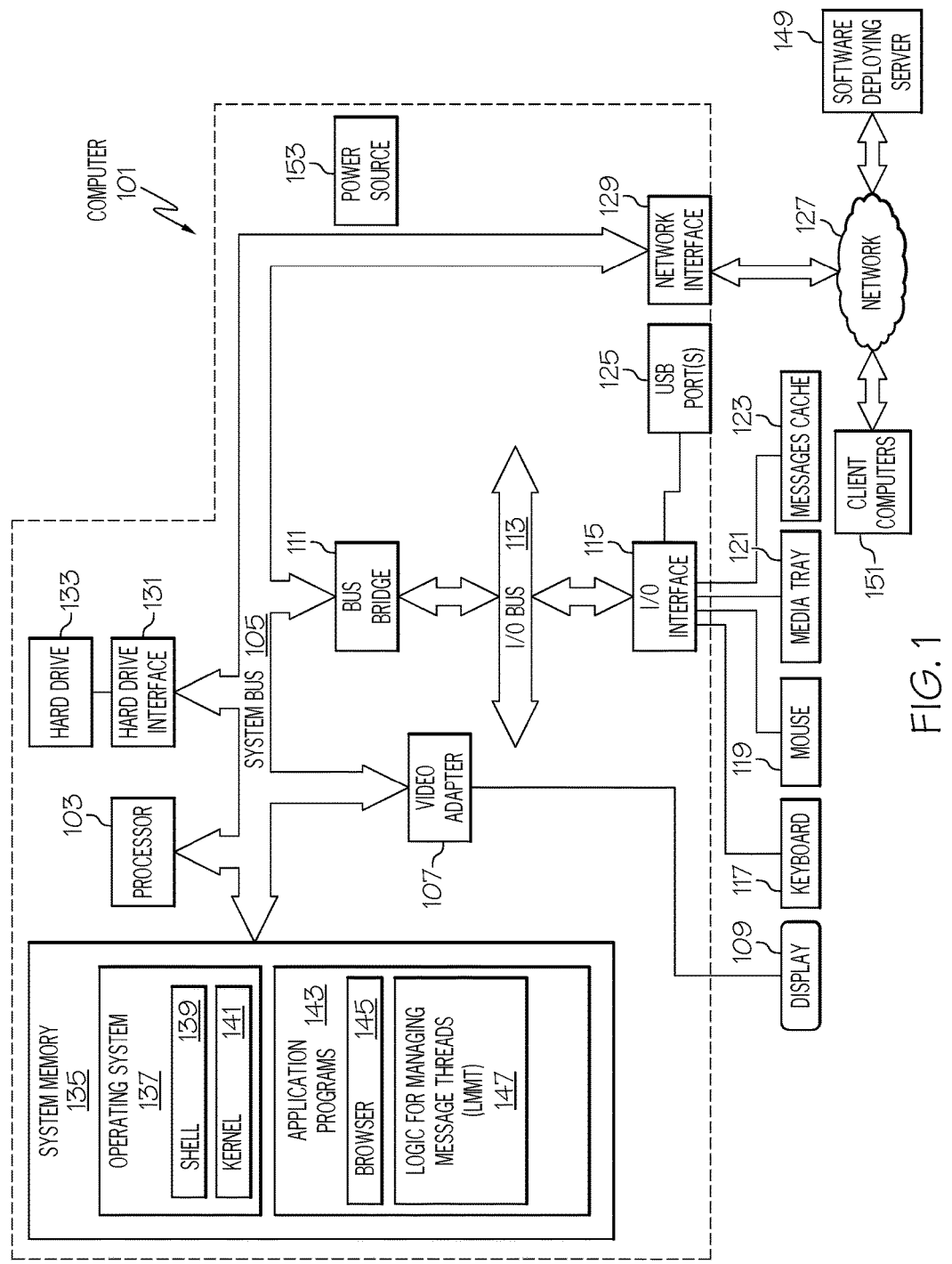
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or client computers 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), messages cache 123, and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with software deploying server 149 and/or client computer(s) 151 using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging with telecommunication devices 155.

Application programs 143 in computer 101's system memory (as well as software deploying server 149's system memory) also include Logic for Managing Message Threads (LMMT) 147. LMMT 147 includes code for implementing the processes described below, including those described in FIGS. 2-5. In one embodiment, computer 101 is able to download LMMT 147 from software deploying server 149, including in an on-demand basis, wherein the code in LMMT 147 is not downloaded until needed for execution. In one embodiment of the present invention, software deploying server 149 performs all of the functions associated with the present invention (including execution of LMMT 147), thus freeing computer 101 from having to use its own internal computing resources to execute LMMT 147.

Also within computer 101 is a power source 153, which provides power to the hardware components used by computer 101 and depicted in FIG. 1. When operating as a portable device, computer 101 may utilize a battery as power source 153. When operating as a fixed device, computer 101 may utilize a limitless power source (e.g., a power grid from a power utility) as power source 153.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
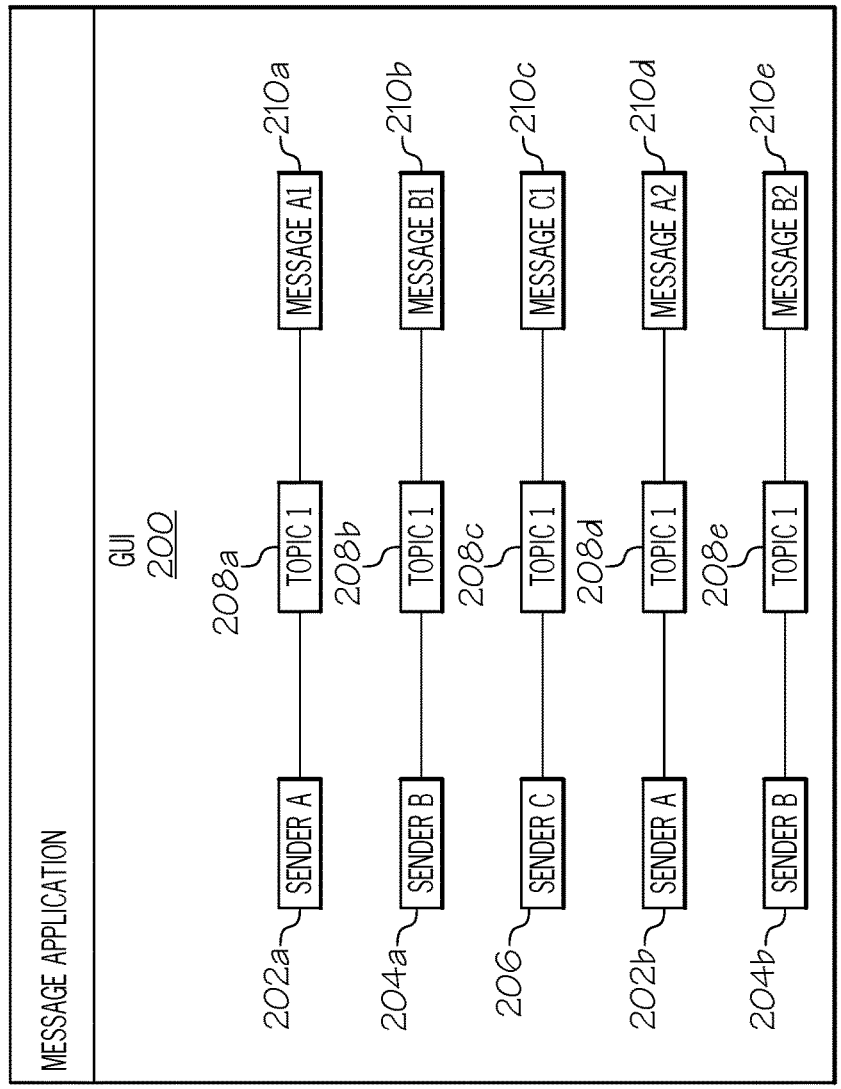
FIG. 2 illustrates an exemplary messaging application graphical user interface (GUI) that is overpopulated from a message thread.

With reference now to FIG. 2, an exemplary messaging application graphical user interface (GUI) 200 (e.g., a GUI being shown in display 109 in FIG. 1) that is overpopulated from a message thread 202 is depicted. GUI 200 may be used by a sender of an initial electronic message and/or by a recipient of the initial electronic message. However, for clarity purposes, assume that GUI 200 is being used by the sender of the initial electronic message.

Thus, assume that a user of a first client computer (e.g., one of the client computers 151 shown in FIG. 1) sent out an initial message (i.e., an electronic message such as a text message, an e-mail, etc.) to multiple other client computers (also from the client computers 151 shown in FIG. 1). This initial electronic message was in regard to Topic 1.

Assume now that users of the multiple other client computers then responded, both to the first client computer that sent the initial message as well as among the multiple other client computers that received the initial message, with responsive electronic messages by creating reply messages and hitting "reply to all". This results in the responsive electronic messages being sent to both the sender of the initial electronic message as well as all of the recipients of the initial electronic message. As shown in FIG. 2, this results in the message thread 202 overpopulating GUI 200, since message thread 202 takes up so much of the display area on GUI 200.

As shown in the example in FIG. 2, the users of the other client computers are identified as Senders A-C, as shown in boxes 202a-202b (for Sender A), boxes 204a-204b (for Sender B), and box 206 (for Sender C). These users are identified as "senders" since they are sending their responses to the initial message electronic message sent by the user of the client computer that is using GUI 200.

As shown in box 202a, Sender A sent Message A1 (identified in box 210a) to GUI 200. As identified by box 208a, Message A1 is related to Topic 1, which is the topic of the initial electronic message.

As shown in box 204a, Sender B sent Message B1 (identified in box 210b) to GUI 200. As identified by box 208b, Message B1 is also related to Topic 1.

As shown in box 206, Sender C sent Message C1 (identified in box 210c) to GUI 200. As identified by box 208c, Message C1 is also related to Topic 1.

As shown in box 202b, Sender A also sent Message A2 (identified in box 210d) to GUI 200. As identified by box 208d, Message A2 is also related to Topic 1, but is a second reply/response message to the initial electronic message related to Topic 1.

As shown in box 204b, Sender B also sent Message B2 (identified in box 210e) to GUI 200. As identified by box 208e, Message B2 is also related to Topic 1, but is a second reply/response message to the initial electronic message related to Topic 1.

Thus, these various responses, including single responses (from Sender C) and multiple responses (from Senders A and B) quickly fill up GUI 200. In order to address this problem, a message server (e.g., computer 101 shown in FIG. 1) generates a consolidated message, which replaces the messages shown in FIG. 2.

Figure 3:
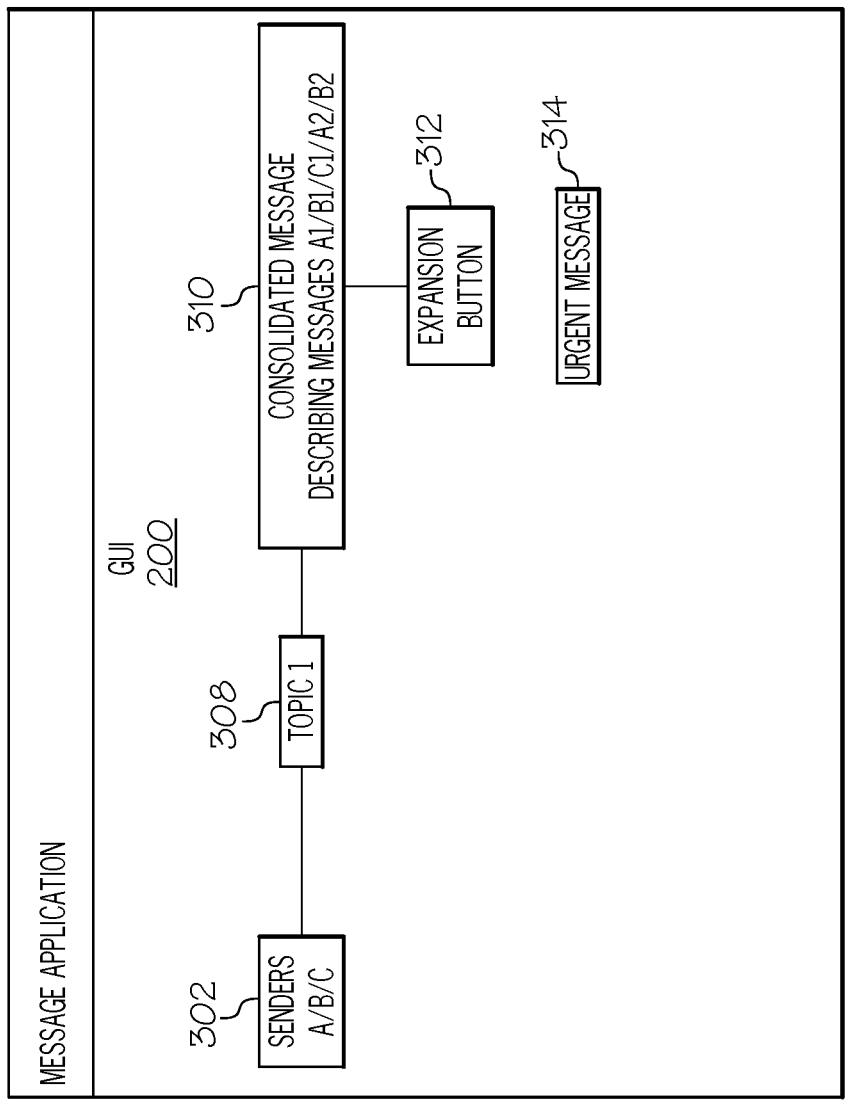
FIG. 3 depicts the messaging application GUI after the message thread is replaced with a single consolidated message.

As shown in FIG. 3, then, box 302 identifies Senders A, B, and C as sending responsive messages to Topic 1 (identified in box 308). These responsive messages (i.e., Messages A1-A2, B1-B2, and C) are then consolidated into a single consolidated message (shown in box 310), which is shown on GUI 200 instead of the Messages A1-A2, B1-B2, and C shown in FIG. 2.

Consolidated message 310 can take on various forms in accordance with different embodiments of the preset invention. In one embodiment, consolidated message (shown in box 310) includes the actual content of Messages A1-A2, B1-B2, and C. This still reduces the amount of space taken up on GUI 200, since information can be compressed into a smaller space, and the identities of all of the senders and the Topic 1 are respectively shown on single boxes (302/308).

However, in a preferred embodiment, consolidated message (shown in box 310) is a condensed version of Messages A1-A2, B1-B2, and C. That is, computer 101 (acting as the message server) will perform a contextual text analysis of the Messages A1-A2, B1-B2, and C to generate the consolidated message (shown in box 310). For example, assume that Messages A1-A2, B1-B2, and C all contained only the text "I agree with original electronic message" or a logical version thereof. As such, consolidated message (shown in box 310) will only contain the text "I agree with original electronic message". If the user of GUI 200 wants to confirm that all of Messages A1-A2, B1-B2, and C actually said this, then the user can click expansion button 312, which will cause the GUI to be repopulated with boxes 210a-210e shown in FIG. 2.

Similarly, if some of Messages A1-A2, B1-B2, and C contain the text "I agree with original electronic message" and others of Messages A1-A2, B1-B2, and C contain the text "I would like management to address the content in original electronic message", then both "I agree with original electronic message" and "I would like management to address the content in original electronic message" will be included in consolidated message (shown in box 310).

In one embodiment of the present invention, consolidated message (shown in box 310) not only includes text from Messages A1-A2, B1-B2, and C, but also describes a sentiment trending of Messages A1-A2, B1-B2, and C. For example, assume that Messages A1-A2, B1-B2 and C were sent to the original message sender in the order of Message A1, B1, C, A2, and B2. Assume further that Message A1 included a very negative term such as "hate", Message B1 included a less negative term such as "dislike", Message C included a more neutral term such as "indifferent", Message A2 included a positive term "like", and Message B2 included a very positive term "adore". Thus, there is a positive sentiment trending in Messages A1-A2, B1-B2 and C. Conversely, if the terms in the messages were reversed (i.e., Message B2 included the term "hate" and Message A1 included the term "adore", etc.), then there is a negative sentiment trending in Messages A1-A2, B1-B2 and C.

In an embodiment of the present invention, the initial message thread is broken out into sub-threads according to sub-topics. That is, the initial Topic 1 described in FIG. 2 may be related to "Marketing results". However, sometimes users go off topic (e.g., away from "Marketing results"), and discuss unrelated topics (e.g., "Viral videos" of kittens playing, etc.) As such, it is hard for a user to determine which messages in the message thread are actually related to Topic 1 ("Marketing results") identified in the subject box (see boxes 208*a*-208*e* in FIG. 2) and which are related to viral videos (even though they show the same Topic 1 in boxes 208*a*-208*e* in FIG. 2).

In order to address this problem, the message server (e.g., computer 101 in FIG. 1) examines all electronic messages related to Topic 1 (and coming from client computers 151 in FIG. 1) to determine the actual topic of these messages. This examination can be performed by a text analysis (e.g., looking for certain key words such as "marketing" and "kittens") in the Messages A1-A2, B1-B2 and C. Based on this analysis, the message server determines that messages A1, B1, and A2 are related to Topic 1 ("Marketing"), but messages C and B2 are related to Topic 2 ("viral videos" about kittens).

Figure 4:
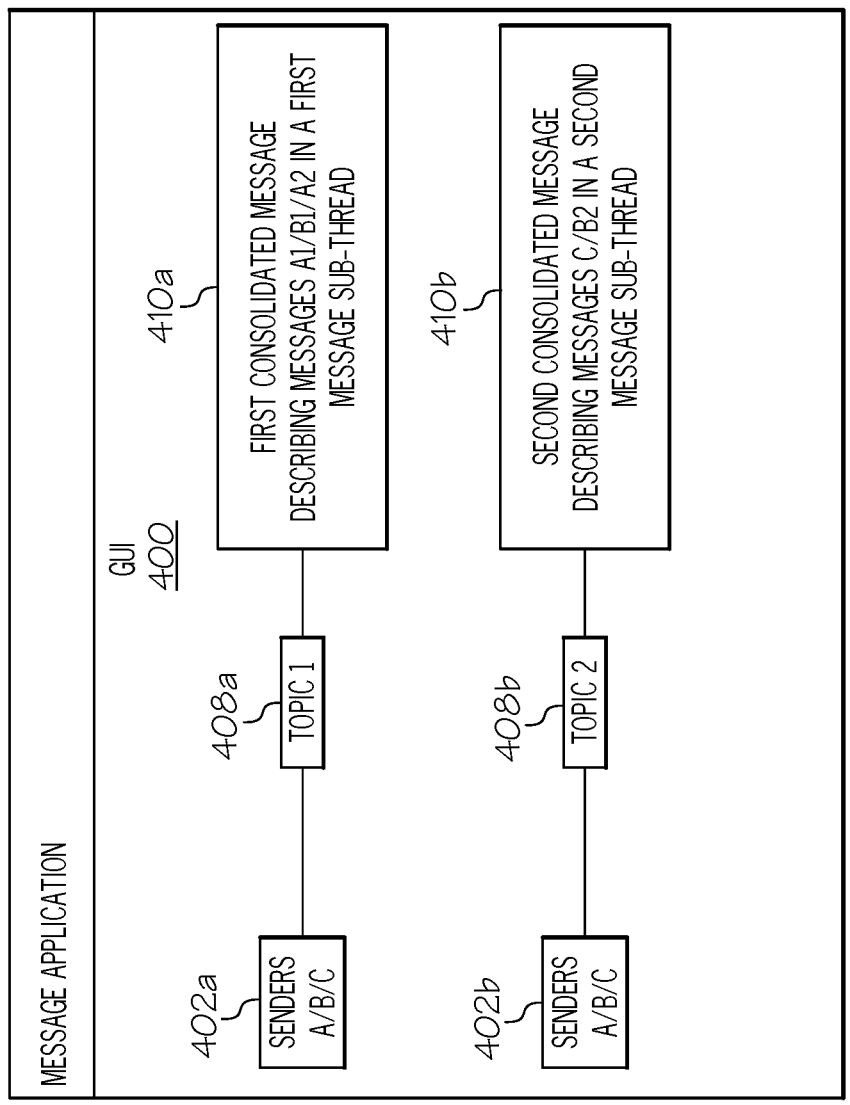
FIG. 4 illustrates multiple consolidated messages for message sub-threads.

With reference then to FIG. 4, GUI 400 depicts consolidated messages for message sub-threads. That is, as shown in box 402*a*, Senders A and B sent messages A1/B1/A2 related to Topic 1 ("Marketing"), as identified in box 408*a*. The message server (i.e., computer 101 shown in FIG. 1) then creates a first consolidated message (shown in box 410*a*), which is a condensed/consolidated message describing the contents of Messages A1, B1, and A2. First consolidated message (shown in box 410*a*) is generated by message server in the manner described above for generating a consolidated message (shown in box 310 in FIG. 3).

As shown in box 402*b*, Senders B and C sent messages C/B2 related to Topic 2 ("viral videos" of kittens), as identified in box 408*b*. The message server then creates a second consolidated message 410*b*, which is a condensed/consolidated message describing the contents of Messages C and B2. Second consolidated message 410*b* is generated by message server in the manner described above for generating a consolidated message (shown in box 310 in FIG. 3).

First consolidated message 410*a* and/or second consolidated message 410*b* may be a compilation, a condensation, a sentiment trending, etc. as described above for a consolidated message (shown in box 310 in FIG. 3).

Figure 5:
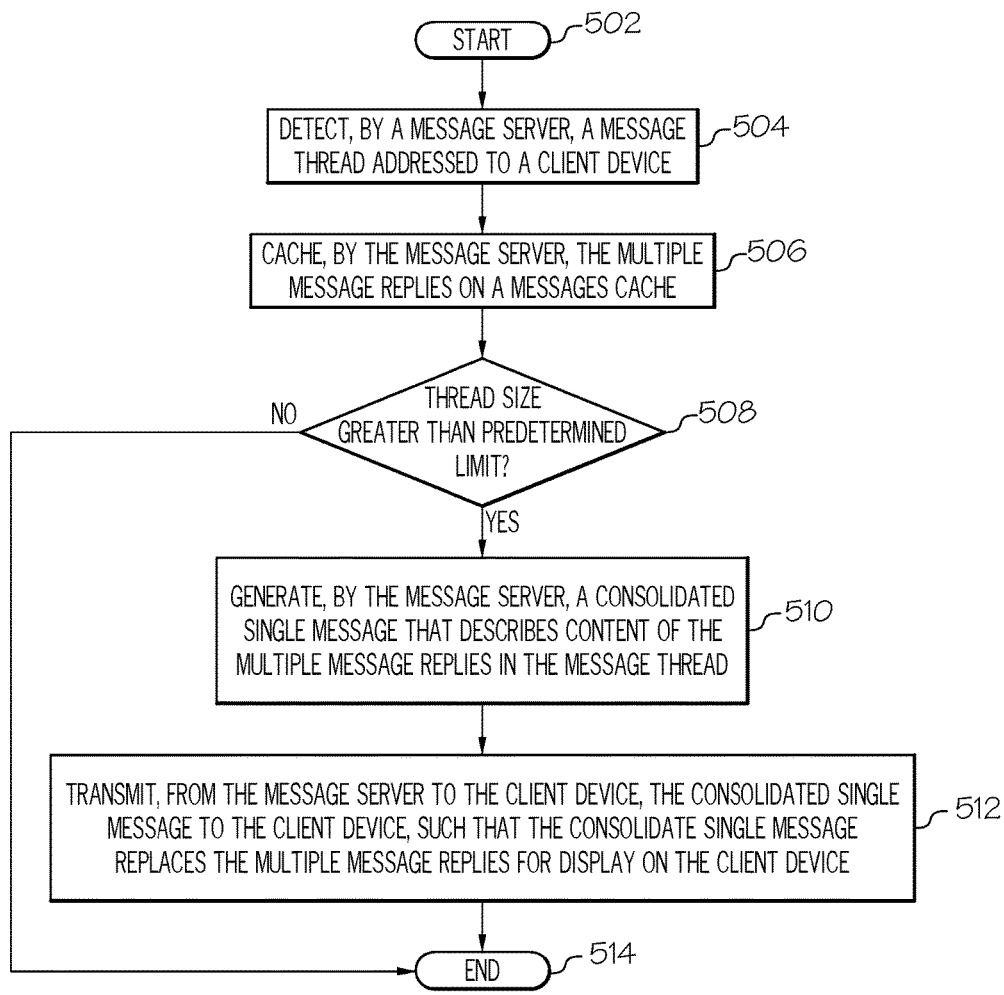
FIG. 5 is a high-level flow chart of one or more steps performed by a message server to manage message threads in accordance with one or more embodiments of the present invention.

With reference now to FIG. 5, a high-level flow chart of one or more steps performed by a message server to manage message threads in accordance with one or more embodiments of the present invention is presented.

After initiator block 502, a message server (e.g., computer 101 shown in FIG. 1) detects a message thread addressed to a client device (e.g., one of the client computers 151 shown in FIG. 1), as described in block 504. The message thread is made up of an exchange of multiple message replies related to a first topic discussed in an initial message, and the multiple message replies are from multiple other client devices (e.g., other client computers from client computers 151 shown in FIG. 1).

As described in block 504, the message server caches the multiple message replies in a messages cache (e.g., messages cache 123 shown in FIG. 1, which may be accessible via an I/O interface as shown, or may be part of an internal architecture of computer 101 acting as the message server).

As described in query block 508, the message server determines whether or not a quantity of messages in the message thread exceeds a predetermined limit during a specified amount of time. For example, assume that the predetermined limit has been no more than 5 reply/response messages to an initial message should be received by a client device in an hour. If 6 or more reply/response messages are received within an hour, then the predetermined limit has been exceeded.

As described in block 510, in response to determining that the quantity of messages in the message thread exceeds the predetermined limit during the specified amount of time, the message server generates a consolidated single message (e.g., the consolidated message shown in box 310 in FIG. 3) that describes content of the multiple message replies in the message thread.

As described in block 512, the message server transmits, to the client device, the consolidated single message to the client device. As shown in FIG. 3, the consolidate single message replaces the multiple message replies for display on the client device (e.g., GUI 200 as shown in FIG. 3).

The flow chart ends at terminator block 514.

In an embodiment of the present invention, the message server identifies a quantity of unread messages on the client device. In response to determining that the quantity of unread messages is below a predetermined quantity, the message server retrieves the multiple message replies from the messages cache and transmits, to the client device, the multiple message replies, such that the multiple message replies replace the consolidated single message for display on the client device. For example, assume that the user of GUI 200 described above has read all (or all but a couple) of the messages in his/her message inbox. As such, the system will assume that the user has time to read the detailed message thread 202 shown in FIG. 2, and will automatically replace the consolidated message shown in box 310 with the detailed message thread 202 on the GUI 200.

In an embodiment of the present invention, the message server determines a sentiment progression of the multiple message replies. In response to determining that the sentiment progression of the multiple message replies matches a predetermined sentiment progression, the message server retrieves the multiple message replies from the messages cache and transmits, to the client device, the multiple message replies, such that the multiple message replies replace the consolidated single message for display on the client device. For example, assume that the sentiment trending of Messages A1-A2, B1-B2, and C discussed above was a positive sentiment trending (i.e., from the first reply/response message using words like "hate" to the last reply/response message using words like "adore"). Based on this positive trending, the message server will determine that the recipient of the message thread 202 would like to see the actual Messages A1-A2, B1-B2 and C.

Alternatively, assume that the sentiment trending of Messages A1-A2, B1-B2, and C discussed above was a negative sentiment trending (i.e., from the first reply/response message using words like "adore" to the last reply/response message using words like "hate"). Based on this negative trending, the message server will determine that the recipient of the message thread 202 would need to see the actual Messages A1-A2, B1-B2 and C.

The decision on whether to display Messages A1, B1, C, A2, and B2 based on sentiment trending can be set by rules, user preferences, flags, etc. in the system.

Alternatively, the message server, upon determining the sentiment progression (positive or negative) of the multiple message replies, may transmit an instruction to the client device (i.e., the client device on which the GUI 200 is being displayed) to remove the consolidated single message from the client device and to block receipt of the multiple message replies by the client device. That is, if the trending is so severe, either positive or negative, the message server will determine (based on a rule, a user preference, etc.) that there is no need to look at the Messages A1, B1, C, A2, and B2, since they are likely the result of puffery (in the case of an overly positive sentiment trending) or retaliation (in the case of an overly negative sentiment trending).

In an embodiment of the present invention, the message server receives a consolidated reply from the client device. The consolidated reply is a single reply to the consolidated single message. The message server then delivers the consolidated reply to the multiple other client devices. That is, the addressee of the message thread does not respond to each of the multiple message replies (e.g., Messages A1-A1, B1-B2, C described above). Rather, the addressee of the message thread responds to the consolidated single message. This allows the user to respond to the message thread by 1) including his/her response in his message, and to 2) include the text of the consolidated message in his response, so that the recipients of his message will know what he is responding to.

In an embodiment of the present invention, the message server identifies an urgent flag in an urgent message reply from the message thread, and transmits the urgent message reply to the client device for display on the client device in addition to the consolidated single message. That is, assume that in FIG. 2 that Messages A1-A2 and B1-B2 were not urgent messages (i.e., were not time sensitive, mission critical, etc. as defined by user-selected rules, etc.). However, Message C required a response within one hour. Otherwise, a time window for participating in a meeting, accepting a contract offer, etc. will expire. This urgent message would ordinarily be "lost" in the consolidated message shown in box 310 in FIG. 3. However, in this embodiment, both box 310 containing the consolidated message, as well as another box 314 (containing the urgent message as shown in FIG. 3), will be displayed on the user's GUI 200.

In an embodiment of the present invention, the message server creates a first message sub-thread and a second message sub-thread from the message thread, such that the first message sub-thread contains messages related to the first topic, and where the second message sub-thread contains messages related to a second topic (see FIG. 4). The message server then generates a first consolidated message (e.g., the first consolidated message shown in box 410a in FIG. 4) that describes content of messages in the first message sub-thread and a second consolidated message (e.g., the second consolidated message shown in box 410b in FIG. 4) that describes content of messages in the second message sub-thread. The message server then transmits, to the client device, the first consolidated message and the second consolidated message, such that the first consolidated message and the second consolidated message replace the consolidated single message displayed on the client device (see FIG. 4).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of managing message threads, the method comprising:
    detecting, by a message server, a message thread addressed to a client device, wherein the message thread comprises an exchange of multiple message replies to messages related to a first topic;
    determining, by the message server, whether a quantity of messages in the message thread exceeds a predetermined limit during a specified amount of time;
    in response to determining that the quantity of messages in the message thread exceeds the predetermined limit during the specified amount of time, generating, by the message server, a consolidated single message that describes content of the multiple message replies in the message thread; and
    transmitting, from the message server to the client device, the consolidated single message.

2. The method of claim 1, further comprising:
    identifying, by the message server, a quantity of unread messages on the client device; and
    in response to determining that the quantity of unread messages is below a predetermined quantity, retrieving, by the message server, the multiple message replies from a messages cache and transmitting, from the message server to the client device, the multiple message replies, wherein the multiple message replies replace the consolidated single message for display on the client device.

3. The method of claim 1, further comprising:
  determining, by the message server, a sentiment progression of the multiple message replies; and
  in response to determining that the sentiment progression of the multiple message replies matches a predetermined sentiment progression, retrieving, by the message server, the multiple message replies from a messages cache and transmitting, from the message server to the client device, the multiple message replies, wherein the multiple message replies replace the consolidated single message for display on the client device.

4. The method of claim 1, further comprising:
  determining, by the message server, a sentiment progression of the multiple message replies; and
  in response to determining that the sentiment progression of the multiple message replies matches a predetermined sentiment progression, transmitting, from the message server to the client device, an instruction to remove the consolidated single message from the client device and to block receipt of the multiple message replies by the client device.

5. The method of claim 1, wherein the multiple message replies are from multiple other client devices, and wherein the method further comprises:
  receiving, by the message server, a consolidated reply from the client device, wherein the consolidated reply is a single reply to all of the multiple message replies in the message thread; and
  delivering, by the message server, the consolidated reply to the multiple other client devices.

6. The method of claim 1, further comprising:
  identifying, by the message server, an urgent flag in an urgent message reply from the message thread; and
  transmitting, by the message server, the urgent message reply to the client device for display on the client device in addition to the consolidated single message.

7. The method of claim 1, further comprising:
  creating, by the message server, a first message sub-thread and a second message sub-thread from the message thread, wherein the first message sub-thread contains messages related to the first topic, and wherein the second message sub-thread contains messages related to a second topic;
  generating, by the message server, a first consolidated message that describes content of messages in the first message sub-thread and a second consolidated message that describes content of messages in the second message sub-thread; and
  transmitting, from the message server to the client device, the first consolidated message and the second consolidated message, wherein the first consolidated message and the second consolidated message replace the consolidated single message displayed on the client device.

8. A computer program product for managing message threads, the computer program product comprising a non-transitory computer readable storage medium having program code embodied therewith, the program code readable and executable by a processor to perform a method comprising:
  detecting a message thread addressed to a client device, wherein the message thread comprises an exchange of multiple message replies to messages related to a first topic;
  determining whether a quantity of messages in the message thread exceeds a predetermined limit during a specified amount of time;
  in response to determining that the quantity of messages in the message thread exceeds the predetermined limit during the specified amount of time, generating a consolidated single message that describes content of the multiple message replies in the message thread; and
  transmitting, to the client device, the consolidated single message.

9. The computer program product of claim 8, wherein the method further comprises:
  identifying a quantity of unread messages on the client device; and
  in response to determining that the quantity of unread messages is below a predetermined quantity, retrieving the multiple message replies from a messages cache and transmitting, from the message server to the client device, the multiple message replies, wherein the multiple message replies replace the consolidated single message for display on the client device.

10. The computer program product of claim 8, wherein the method further comprises:
  determining a sentiment progression of the multiple message replies; and
  in response to determining that the sentiment progression of the multiple message replies matches a predetermined sentiment progression, retrieving the multiple message replies from a messages cache and transmitting, to the client device, the multiple message replies, wherein the multiple message replies replace the consolidated single message for display on the client device.

11. The computer program product of claim 8, wherein the method further comprises:
  determining a sentiment progression of the multiple message replies; and
  in response to determining that the sentiment progression of the multiple message replies matches a predetermined sentiment progression, transmitting, to the client device, an instruction to remove the consolidated single message from the client device and to block receipt of the multiple message replies by the client device.

12. The computer program product of claim 8, wherein the multiple message replies are from multiple other client devices, wherein the method further comprises:
  receiving a consolidated reply from the client device, wherein the consolidated reply is a single reply to all of the multiple message replies in the message thread; and
  delivering the consolidated reply to the multiple other client devices.

13. The computer program product of claim 8, wherein the method further comprises:
  identifying an urgent flag in an urgent message reply from the message thread; and
  transmitting the urgent message reply to the client device for display on the client device in addition to the consolidated single message.

14. The computer program product of claim 8, wherein the method further comprises:
  creating a first message sub-thread and a second message sub-thread from the message thread, wherein the first message sub-thread contains messages related to the first topic, and wherein the second message sub-thread contains messages related to a second topic;
  generating a first consolidated message that describes content of messages in the first message sub-thread and a second consolidated message that describes content of messages in the second message sub-thread; and transmitting, to the client device, the first consolidated message and the second consolidated message, wherein the first consolidated message and the second consolidated message replace the consolidated single message displayed on the client device.

15. A computer system comprising:
a processor, a computer readable memory, and a non-transitory computer readable storage medium;
first program instructions to detect a message thread addressed to a client device, wherein the message thread comprises an exchange of multiple message replies to messages related to a first topic;
second program instructions to determine whether a quantity of messages in the message thread exceeds a predetermined limit during a specified amount of time;
third program instructions to, in response to determining that the quantity of messages in the message thread exceeds the predetermined limit during the specified amount of time, generate a consolidated single message that describes content of the multiple message replies in the message thread; and
fourth program instructions to transmit, to the client device, the consolidated single message; and wherein
the first, second, third, and fourth program instructions are stored on the non-transitory computer readable storage medium for execution by one or more processors via the computer readable memory.

16. The computer system of claim 15, further comprising:
fifth program instructions to identify a quantity of unread messages on the client device; and
sixth program instructions to, in response to determining that the quantity of unread messages is below a predetermined quantity, retrieve the multiple message replies from a messages cache and transmitting, from the message server to the client device, the multiple message replies, wherein the multiple message replies replace the consolidated single message for display on the client device; and wherein
the fifth and sixth program instructions are stored on the non-transitory computer readable storage medium for execution by one or more processors via the computer readable memory.

17. The computer system of claim 15, further comprising:
fifth program instructions to determine a sentiment progression of the multiple message replies; and
sixth program instructions to, in response to determining that the sentiment progression of the multiple message replies matches a predetermined sentiment progression, retrieve the multiple message replies from a messages cache and transmit, to the client device, the multiple message replies, wherein the multiple message replies replace the consolidated single message for display on the client device; and wherein the fifth and sixth program instructions are stored on the non-transitory computer readable storage medium for execution by one or more processors via the computer readable memory.

18. The computer system of claim 15, further comprising:
fifth program instructions to determine a sentiment progression of the multiple message replies; and
sixth program instructions to, in response to determining that the sentiment progression of the multiple message replies matches a predetermined sentiment progression, transmit, to the client device, an instruction to remove the consolidated single message from the client device and to block receipt of the multiple message replies by the client device; and wherein
the fifth and sixth program instructions are stored on the non-transitory computer readable storage medium for execution by one or more processors via the computer readable memory.

19. The computer system of claim 15, further comprising:
fifth program instructions to identify an urgent flag in an urgent message reply from the message thread; and
sixth program instructions to transmit the urgent message reply to the client device for display on the client device in addition to the consolidated single message; and wherein
the fifth and sixth program instructions are stored on the non-transitory computer readable storage medium for execution by one or more processors via the computer readable memory.

20. The computer system of claim 15, further comprising:
fifth program instructions to create a first message sub-thread and a second message sub-thread from the message thread, wherein the first message sub-thread contains messages related to the first topic, and wherein the second message sub-thread contains messages related to a second topic;
sixth program instructions to generate a first consolidated message that describes content of messages in the first message sub-thread and a second consolidated message that describes content of messages in the second message sub-thread; and
seventh program instructions to transmit, to the client device, the first consolidated message and the second consolidated message, wherein the first consolidated message and the second consolidated message replace the consolidated single message displayed on the client device; and wherein
the fifth, sixth, and seventh program instructions are stored on the non-transitory computer readable storage medium for execution by one or more processors via the computer readable memory.

* * * * *